(12) United States Patent
Simms

(10) Patent No.: US 6,497,642 B1
(45) Date of Patent: Dec. 24, 2002

(54) MANDREL AND TOOLING REPLACEMENT AND APPARATUS THEREFOR

(75) Inventor: Paul Simms, Bradford (GB)

(73) Assignee: Meltog Ltd., Birstall (GB)

( * ) Notice: Subject to any disclaimer, the term of this patent is extended or adjusted under 35 U.S.C. 154(b) by 0 days.

(21) Appl. No.: 09/595,587

(22) Filed: Jun. 15, 2000

(30) Foreign Application Priority Data

Jul. 8, 1999 (GB) ............................................... 9915870

(51) Int. Cl.[7] .......................... B23Q 3/155; B21B 31/10
(52) U.S. Cl. ................................ 483/1; 72/238; 483/28
(58) Field of Search .............................. 483/28, 29, 1; 72/238, 239

(56) References Cited

U.S. PATENT DOCUMENTS

| | | | | |
|---|---|---|---|---|
| 4,251,180 A | * | 2/1981 | Hansen ........................ 414/560 |
| 4,763,505 A | * | 8/1988 | Klute et al. .................... 72/238 |
| 5,600,987 A | * | 2/1997 | Moritz et al. ................. 384/556 |
| 5,660,068 A | * | 8/1997 | Yamamoto et al. ........... 72/164 |
| 5,983,694 A | * | 11/1999 | Woodrow et al. ............. 72/238 |

FOREIGN PATENT DOCUMENTS

| | | | | |
|---|---|---|---|---|
| JP | 59-197316 | * | 11/1984 | ................... 72/239 |
| JP | 61-289906 | * | 12/1986 | ................... 72/239 |
| SU | 325059 | * | 1/1972 | ................... 72/239 |

* cited by examiner

Primary Examiner—William Briggs
(74) Attorney, Agent, or Firm—Bell, Boyd & Lloyd LLC

(57) ABSTRACT

Apparatus and a method for rapidly replacing a tool set included in a bodymaker are disclosed. A bodymaker is used in connection with tin box manufacture and typically includes a mandrel and a set of forming wings disposed above the mandrel and specifically designed for a particular shape of mandrel so that a planar bland disposed above the mandrel can be formed therearound by the forming wings. A support plate mounted on a totally and translatable axially of the mandrel on guide means is rolled into place adjacent the tool set, and the support plate is moved towards the free ends of the tools within the set and connected within the bodymaker. As the support plate approaches the free ends of the tools, latch means provided on the support plate in front of a suitably shaped recess are deflected laterally by a plug formation provided at least on the mandrel.

30 Claims, 7 Drawing Sheets

MANDREL AND TOOLING REPLACEMENT AND APPARATUS THEREFOR

This invention relates to a method for replacing for a mandrel and associated tooling, and suitably designed apparatus for performing this operation specifically for use in machinery adapted for the automated manufacture of tin boxes. A description of such machinery is provided immediately below to enhance the understanding of the reader.

Automated tin box manufacture is accomplished by juxtaposing several different pieces of machinery and providing transfer means therebetween. Tin boxes can be manufactured in a vast number of different shapes and sizes and accordingly a single piece of machinery is required to be sufficiently versatile to enable manufacture of tin boxes in a large number of said shapes and sizes. It will be understood by those skilled in the art that the machinery used has a number of different components which can be exchanged to facilitate the manufacture of different boxes and currently the length of time taken to exchange all these various components to enable a particular set of machines to manufacture a different box shape can be up to an entire day. The invention hereinafter set forth, and also set forth in out co-pending applications have as their object the reduction of this time period. Any reduction achievable in the "changeover" time is especially desirable when it is considered that tin box production rates using the machinery described hereinafter may reach 40 per minute.

Tin boxes can contain a wide variety of different goods, such as bottle, chocolates, biscuits, tea, coffee and the like. Manufacturers of such products commonly consider the containment of their product in tins because of the rigidity and durability which the sheet steel, from which such tins are commonly made, provides. Additionally, the containment of a product in a tin box may also suggest that the product therein is of a certain quality, especially as ornate and detailed print effects can be obtained on the surface of the metal plates from which the tin boxes are manufactured. Such effects cannot be achieved, or are achieved only to a much lesser degree by the containment of products in cardboard cartons or receptacles of plastics materials. A tin box in which such a product is contained has the further advantage of being reusable to contain other household items such as screws, nuts bolts, pencils and pens, etc. after the product originally contained therein has been consumed or otherwise utilised.

The various separate machines required in the manufacture of tin boxes are an "Automatic Curling Notching and Beading" machine, a "bodymaker", a "round and irregular seamer", and an "end feeder", each of which has a specific task to perform during the process of tin box manufacture. Each of these is now described.

The first stage in the process of automated tin box manufacture is the profiling of a simple sheet steel, and generally rectangular, blank from which the walls of the tin box are ultimately constituted. The blank is fed through an "Automatic Notching, Curling and Beading" machine, referred to hereinafter as an ANCB machine. This machine consists of a plurality of consecutively driven rollers disposed both above and below the blank as its passes therebetween, each of said rollers performing a forming step on the blank. The particular profile of each blank as it exits the ANCB machine depends on the ultimate shape of the tin, but in general the blank is substantially flat with the exception of a hem provided parallel with one of the longer edges of the blank and proximate thereto, a bead is provided on one of said longer edges, a partial curl is provided around the alternate longer edge, and a pair of hooks oppositely disposed with respect to one another on the shorter edges. Additionally, the ANCB machine has cutting means which notch the corners of the blank to preclude any interference effects which may be caused by said corners either when the blank is profiled and provided with the hooks along its shorter edges, when it is formed into the cross-sectional shape of the tin box, or when wrapped around and attached to the base of said tin box.

The hem provides a surface behind which the beaded lip of a tin lid can engage to inhibit the removal of a lid separately formed and applied around the uppermost edge of the tin box, the bead is provided to hide the sharp longer edge of the blank which ultimately forms said uppermost edge of the tin box, the partial curl on the alternate longer edge of the blank is provided to facilitate the attachment of the blank, after same has been formed into the desired cross-sectional shape, to the base of the tin box, and the hooks provided along the shorter edges of the blank facilitate the connection of said edges to one another after a subsequent forming operation.

The profiled blank is then fed from the ANCB machine into a "bodymaker" by suitable transport means which generally comprises a pair of reciprocating feed bars in conjunction with "disappearing guides" which simultaneously urge the profiled blank towards and over a forming mandrel and precisely align said blank thereon. The disappearing guides are rotated away from the blank when it is held in contact with the uppermost portion of the mandrel, which is generally of similar shape to the desired cross-sectional shape of the tin box to be manufactured, by a mandrel clamping arrangement. The removal of the disappearing guides (so-called because they "disappear" within the machine during the forming of the blank around the mandrel) allows a pair of forming wings pivotally connected together or to a jig or frame rigidly secured within the bodymaker and disposed above the mandrel rotate about their pivot and form said blank, which is at this stage still substantially planar, around the said mandrel. The forming operation performed by the wings also constrains the oppositely disposed hooks on the shorter edges of the blank to interlock on the underside of the mandrel whereupon a second forming tool compresses the meta of the blank in the interlocked region to form the vertical seam within the wall of the tin box. During all forming operations the blank is clamped against the upper surface of said mandrel by said mandrel clamping arrangement.

The connection of the mandrel and the frame or jig to which the mandrel forming wings are pivotally connected has heretofore been achieved by bolting the various components to the surrounding structure of the bodymaker. It will be appreciated this means of connection of these components is difficult and time-consuming to disengage when the components are to be replaced with other like components when adapting the bodymaker to accommodate different sizes of blanks and when such blanks are to be formed around mandrels of different shapes.

This invention is specifically concerned with the provision of a novel method and apparatus for replacing the mandrel and mandrel forming wings, which are generally provided together as a tooling set.

Currently, as mentioned above, the mandrel and the mandrel forming wings associated therewith are rigidly secured between two walls which form the structure of the bodymaker. Also connected between these walls are the disappearing guides referred to above and mechanical levers which are in turn connected to the mandrel wings above and on either side of the mandrel and cause the mandrel wings to move back and forth away from and around the mandrel. Although all the various components can be disconnected and/or rotated away from mandrel wings and mandrel to permit access thereto and to facilitate the exchange of these particular components, there is no provision for supporting the components as they are removed. The common practice is to place packing blocks on the hammer disposed underneath the mandrel and which impacts same during the formation of the scan on the tin box to support the mandrel during its disconnection and removal from the bodymaker structure. The mandrel wings are first disconnected from their associated mechanical levers are subsequently un-bolted from their pivots to be removed individually.

It is important to mention that these components are weighty and accordingly unwidely and may require the support of many humans during their removal.

It is an object of this invention to provide a method and apparatus which drastically simplifies the changeover process and reduces the labour intensive nature of the operation.

According to the invention there is provided a method of exchanging working components releasably mounted within a bodymaker comprising the steps of disconnecting said components from actuating means within the bodymaker which effect working motion of said components, bringing support means translatable axially of said components adjacent said components at one end thereof and into locking engagement therewith to provide support for said components, releasing said components from their mounting with the bodymaker, and translating said support means with components engaged thereto away from said bodymaker until the components are without the structure of said bodymaker.

Preferably the direction of translation away from the bodymaker is parallel with the longitudinal axes of the components when mounted within said bodymaker. In usual circumstances, the longitudinal axes of said components will be exactly horizontal.

Preferably, the components are a mandrel and associated mandrel forming wings, which will be hereinafter referred to as a mandrel tool set.

Preferably the support means is provided with releasable connection means which receive or compliment corresponding connection means provided at the said one end of the components which can thus be connected thereto.

Preferably the engagement of the respective connection means provided on the components and on the support means ensures that the said component can move only axially, as opposed to angularly, as the connection is made.

Preferably the support means comprises a vertical plate mounted on horizontal guide means and provided with translating actuation means which allow a user to control the horizontal translation of the support means along said guide trails. The extent of travel of the support means must be sufficient to ensure that the components are withdrawn completely from the bodymaker to allow the support means to be moved safely away and without interference from the structure of the bodymaker.

Preferably the support means can rotate with respect to the guide means to allow the components connected thereto to be rotated away from the bodymaker.

Preferably, the connection of the at least one of the components to the support means is effected simultaneously as the said support means is translated towards the said one end of said component.

Most preferably the connection between said support means and said one end is completed exactly at the end of the extend of travel of said support means.

Preferably the support means is disposed on a table which is rotatably indexable with respect to the guide means, said table being latched in at least two positions.

According to a second aspect of the invention there is provided a set of components for use in a bodymaker, said components being provided at one end with connection means which facilitate their connection to a translatable support means and at their other end with connection means which allow for their connection to and release from said bodymaker.

Most preferably the connection of the components within the bodymaker is effected by hydraulically actuated clamp means.

Preferably, the bodymaker is provided with secondary support means which receive at least one of the components connected to the primary support means as it is translated towards and into the bodymaker.

According to a third aspect of the invention there is provided a bodymaker adapted to receive components mounted on translatable support means disposed externally of said bodymaker and which translate towards and into said bodymaker, said bodymaker being provided with secondary support means which receive at least one of said components and support same during its travel into the machine, and further provided with clamp means to rigidly clamp at least one of said components internally of the bodymaker.

Preferably the support means is mounted on trolley means which can be rolled into position laterally of the bodymaker, preferably on rails, and which can be locked in said position immediately prior to translation of the support means and associated components connected thereto in a direction along the axes of said components which thus enter the bodymaker.

The invention will be better understood with reference to the accompanying specific embodiment, but it will be immediately appreciated by those skilled in the art the time taken to change relevant components in a bodymaker can be drastically reduced by the invention. In particular, the facility of the invention for removing both the mandrel forming wings and the pivotal mounting member, together with the mandrel associated therewith is unprecedented. The invention stems from the realisation of the inventor that the mandrel forming wings and the associated mandrel are design as a tool set and one cannot generally be used independently of the other in the bodymaker.

A specific embodiment of the invention is now described by way of example only and with reference to the accompanying diagrams wherein.

Figure 1:
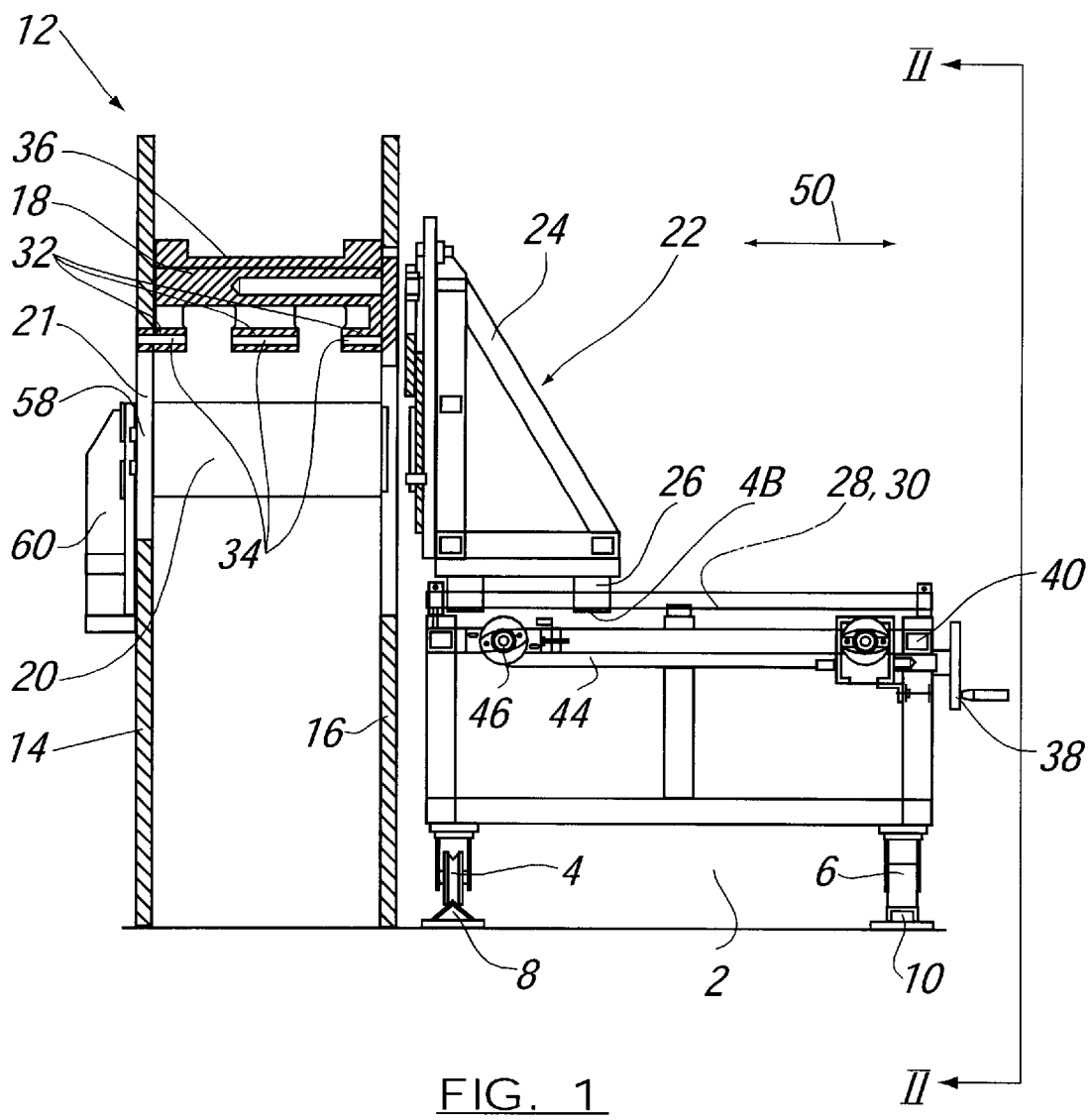
FIG. 1 shows a sectional view of a component support means according to the invention.
Figure 2:
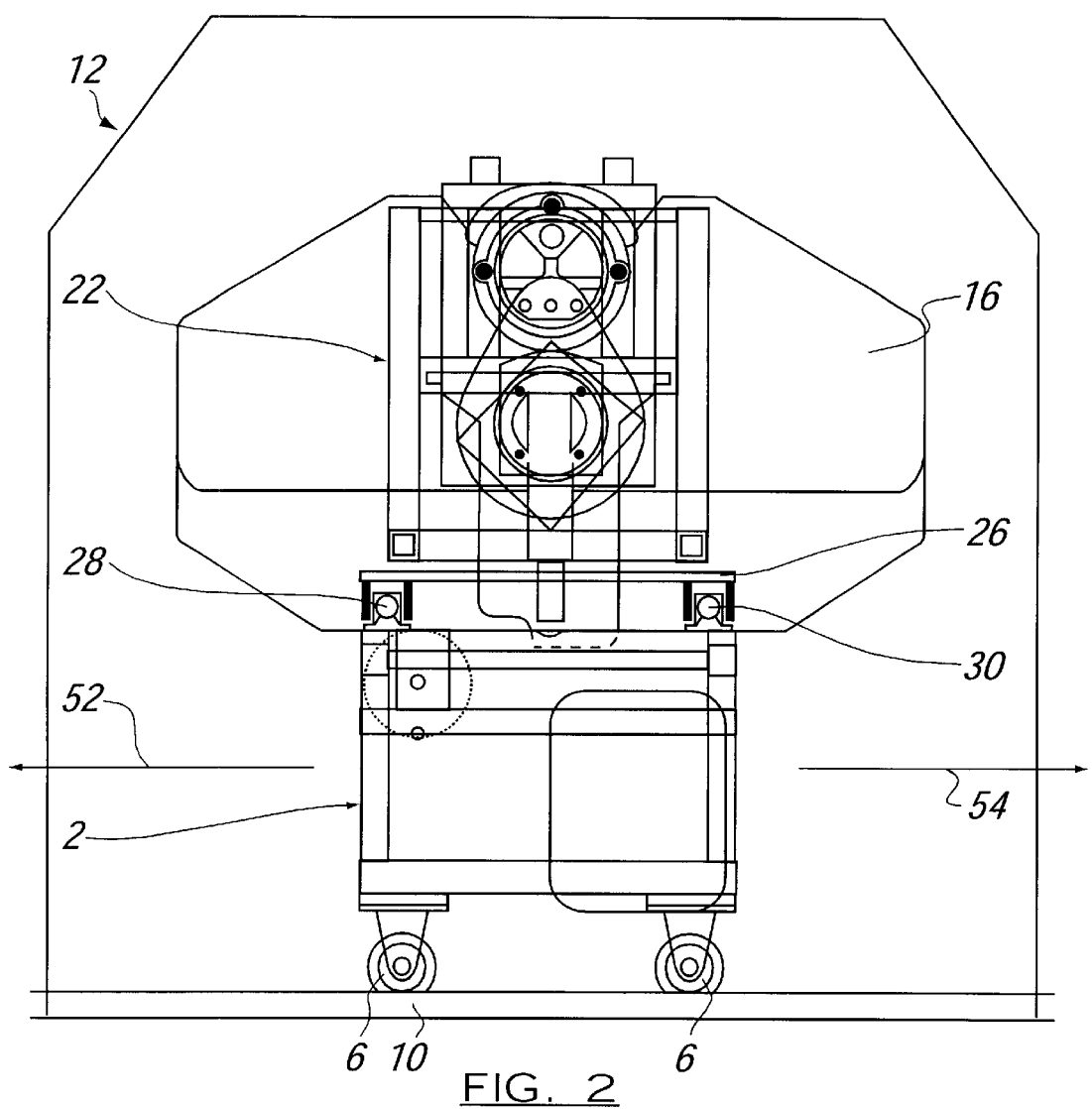
FIG. 2 shows a front elevation on II—II as shown in FIG. 1.
Figure 2B:
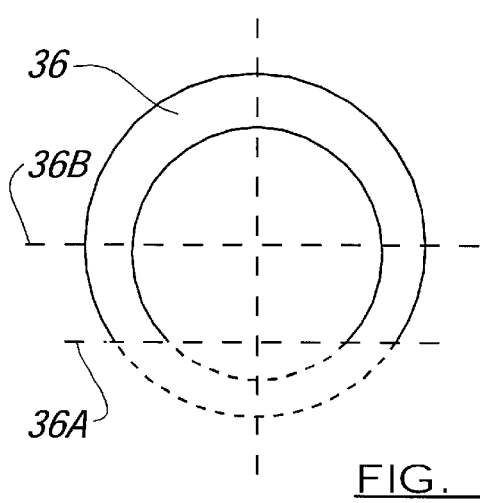
Figure 3:
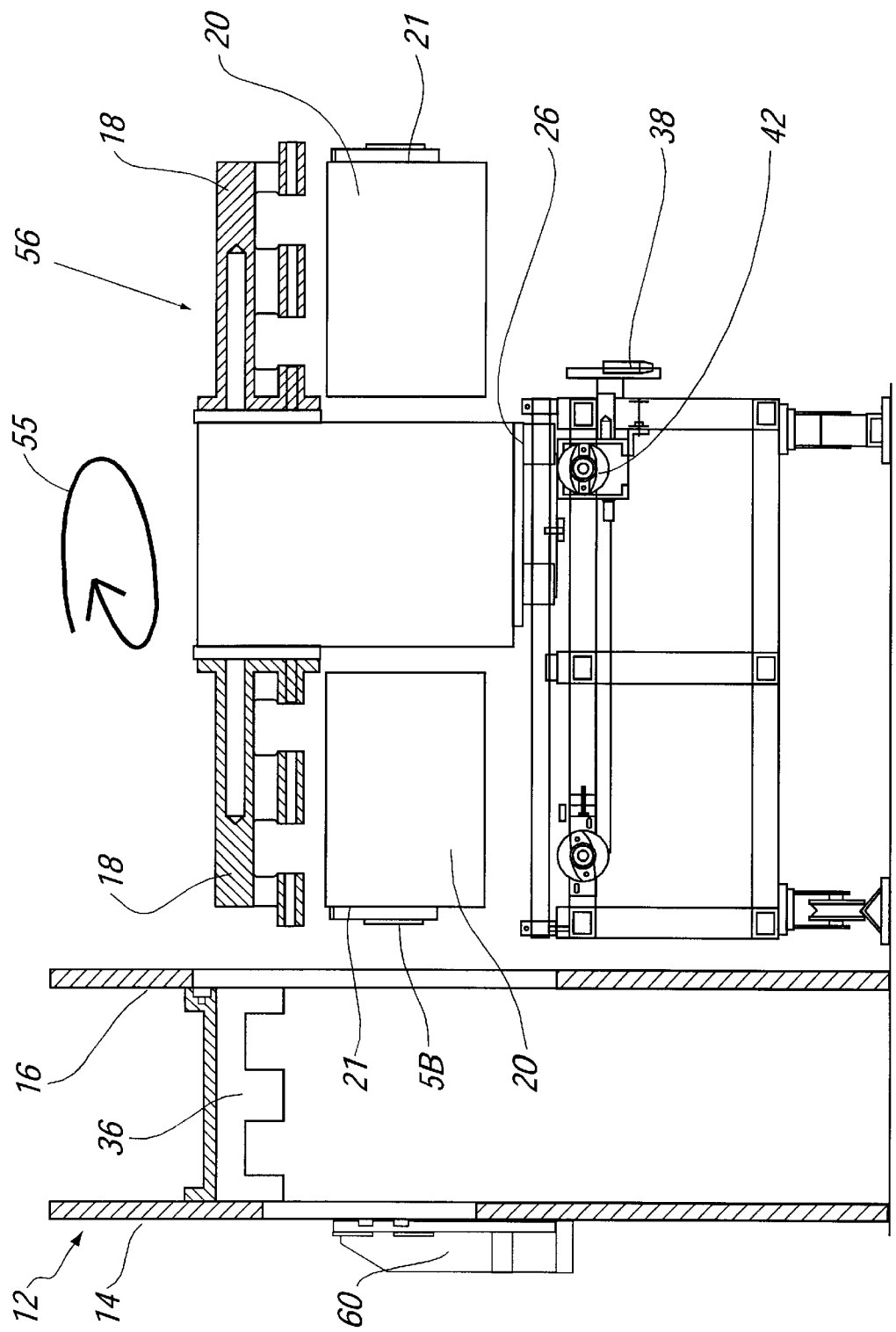
Figure 4:
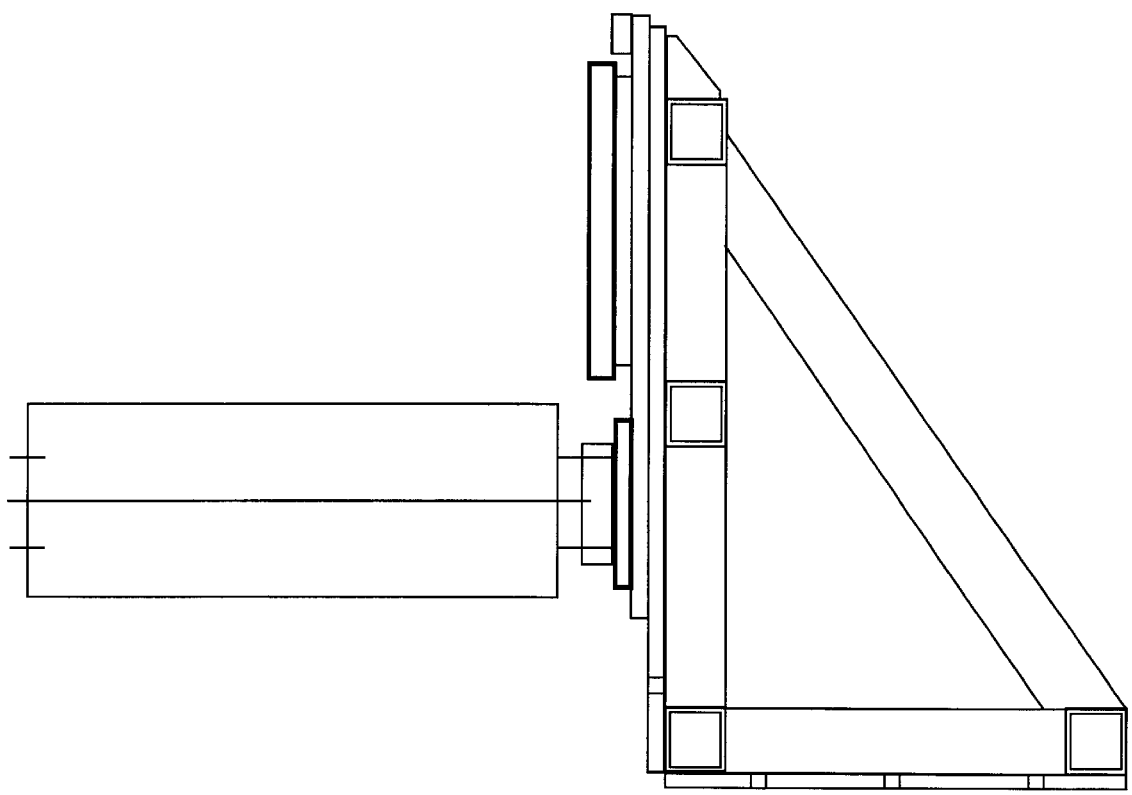
Figure 5A:
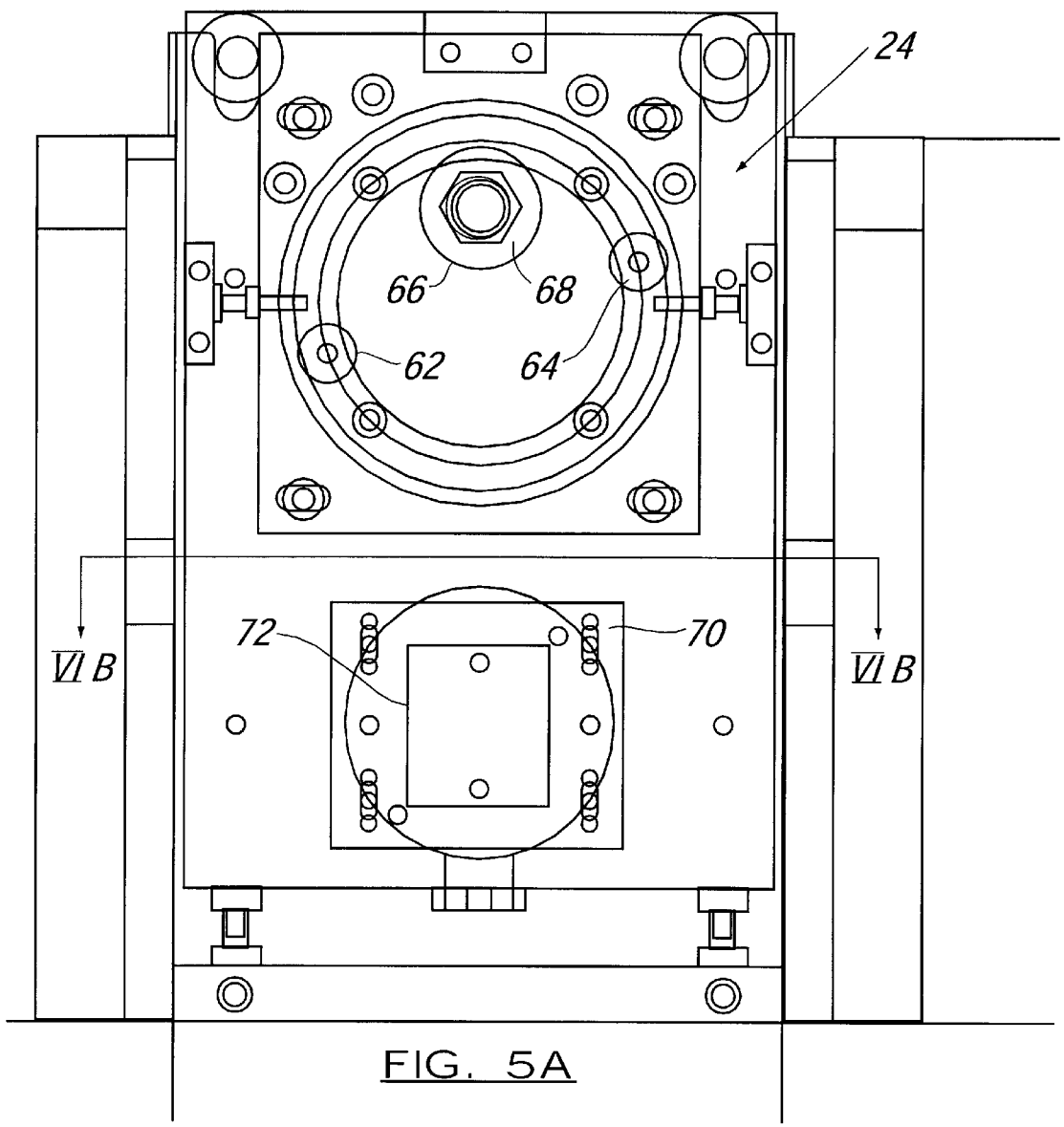
Figure 5B:
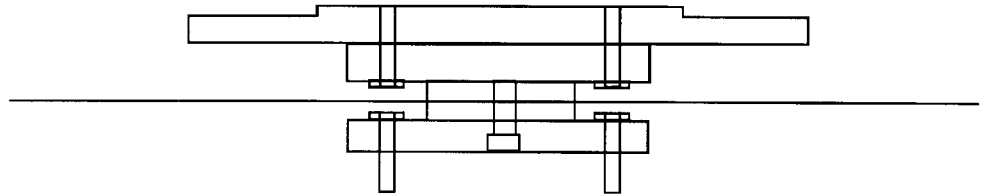
Figure 6A:
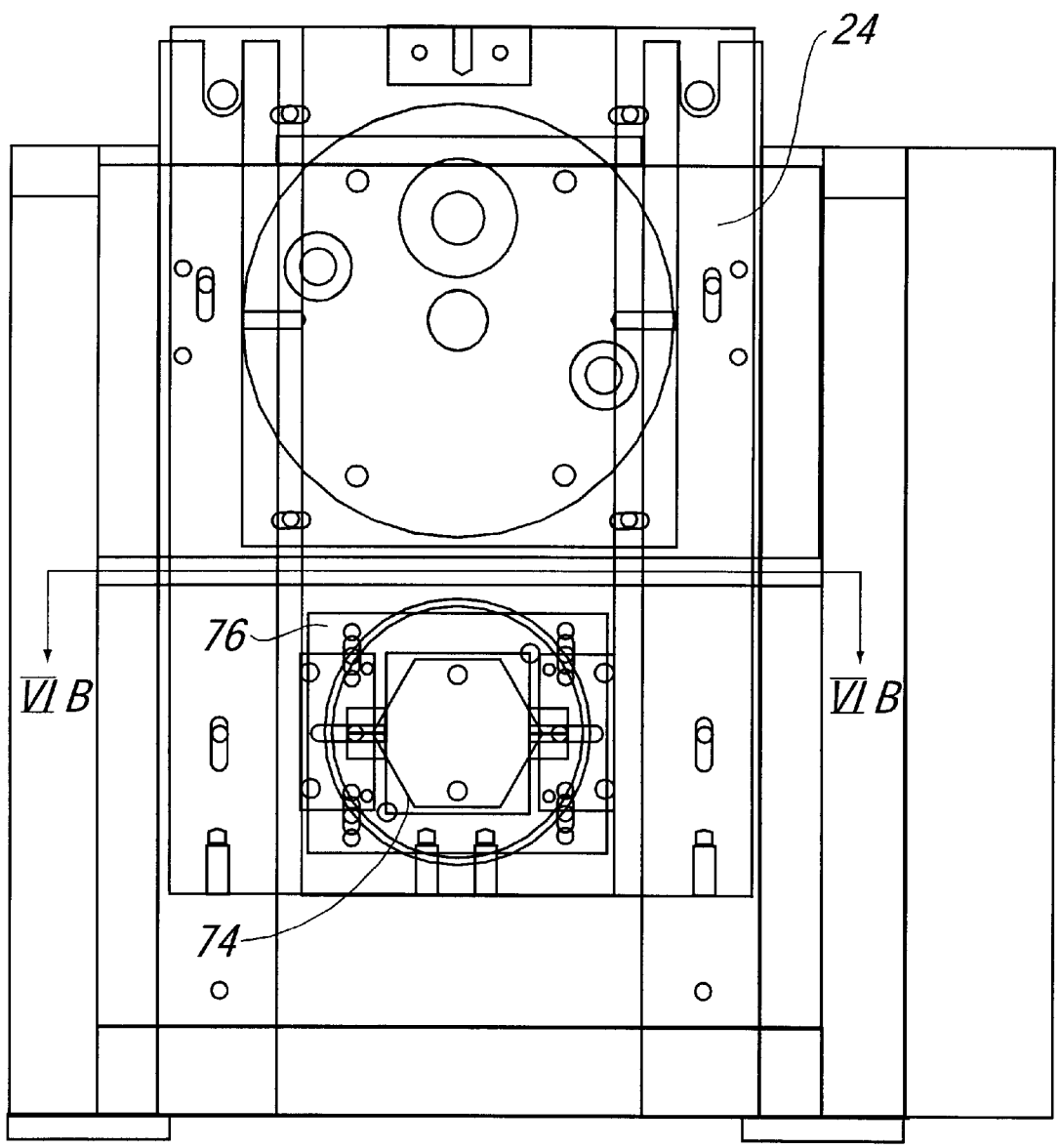
Figure 6B:
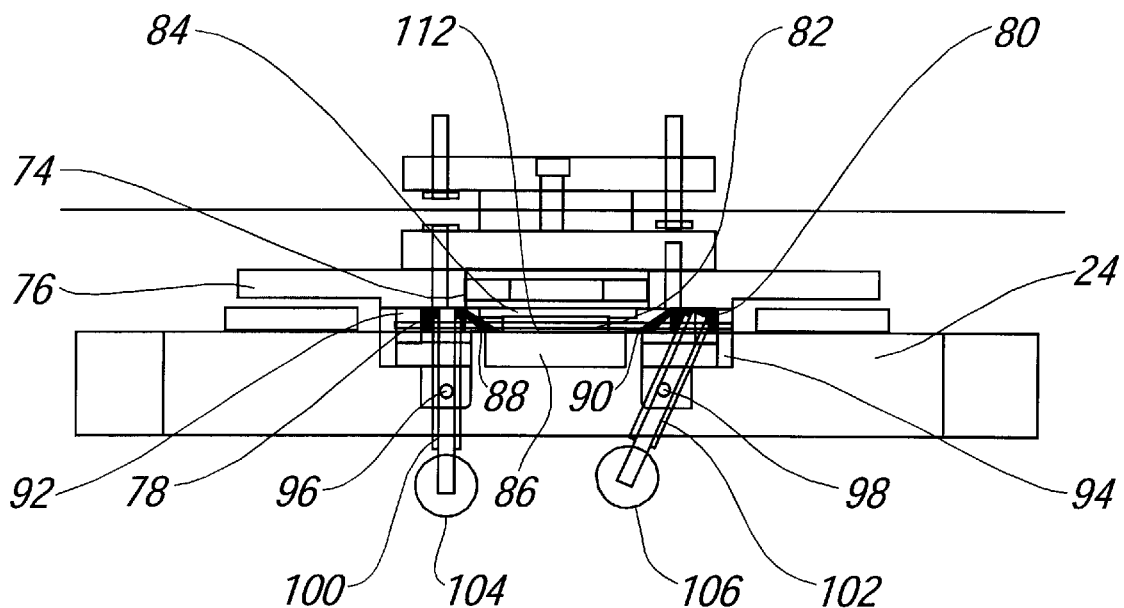
Figure 6C:
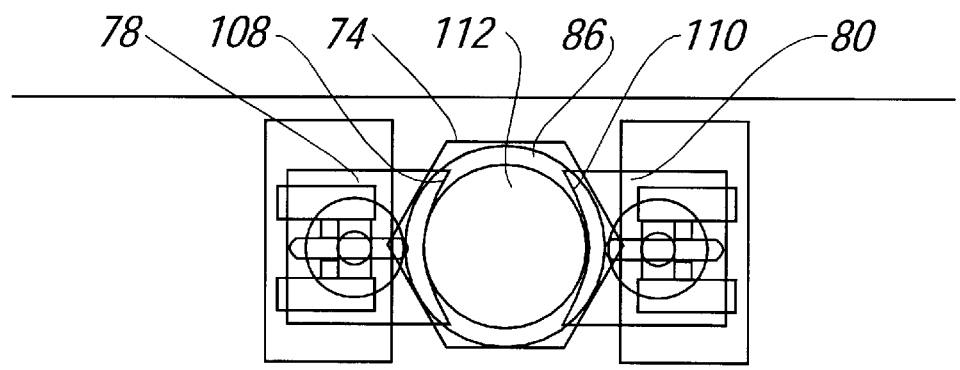

FIG. 2B shows a sectional view of one embodiment of the mandrel wing support member, FIG. 3 shows a sectional view of the device of FIG. 1 with the component support means in a retracted position, FIG. 4 shows a side elevation of the support plate assembly which comprises the majority of the component support means of FIG. 1, FIGS. 5A and 5B show an enlarged front elevation of the support means according to a first embodiment of the invention and a sectional view on line VB, FIGS. 6A and 6B show an enlarged end elevation and corresponding sectional view of a further modified embodiment of the invention, and paragraph FIG. 6C provides a schematic illustration of the manner in which components engage with and are received by the Support means in accordance with the invention.

Referring firstly to FIG. 1, there is shown a trolley indicated generally at 2 which is provided with castors 4, 6 mounted on rails 8, 10 which constrain solid trolley 2 to move in a direction parallel with and adjacent to a bodymaker generally indicted at 12. Said bodymaker 12 comprises a pair of structural frame members 14, 16 between which a mandrel wing supporting member 18 and a mandrel 20 are disposed.

In the configuration shown in FIG. 1, the mandrel wing supporting member 18 and the mandrel 20 appear both connected to the structural frame member 14 of the bodymaker 12 and to a support frame 22 comprising a vertical support plate 24 both of which are mounted on a translatable indexable table 26 which is in turn supported by guide rails 28, 30, as can be seen in FIG. 2. Although not shown in either FIGS. 1 or 2, the mandrel wing supporting member is provided with a plurality of lugs 32 with hollow bores 34 passing therethrough, said lugs 32 being provided symmetrically and beneath and on either side of the longitudinal axis of the said mandrel wing support member 18, and it is these bores which provide a pivot for the mandrel wings which effect the forming operation around the mandrel 20. It is an aspect of this invention that all of the abovementioned components be provided together as a tooling set and connected to the vertical support plate 24 remote from the bodymaker 12, because mandrel forming wings are commonly manufactured according to the particular size, shape and disposition of the mandrel around which the forming operation is effected. It would therefore be unusual for a specific set of forming wings to be capable of being used in connection with different mandrels. However, the invention should not be considered limited by this particular feature for it is the concept of providing a simple, effective, quick and safe means of removing a components from a bodymaker, for example either the forming wings or the mandrel, that this invention seeks to cover.

It is also to be mentioned that when said composition are connected to said vertical support plate 24, the mandrel wings (not shown) ideally are allowed to come to rest with their forming surfaces or platens surrounding the mandrel so that they do not hinder the motion of the various components into the bodymaker. It can be seen from FIG. 2 that the structural frame member 16 has a central aperture through which the components connected to the vertical support plate 24 are delivered, and after the mandrel has been secured to the rear structural frame member 14, the wings are then raised and connected to suitable actuators which control their motion. If the mandrel forming wings were in the raised position, their delivery into the mandrel would be prevented by the solid portions of the structural frame member 16 surrounding the central aperture.

In one embodiment, the mandrel wing support member 18 is received in a mandrel wing shoe 36 which has a partially annular cross-sectional shape, partial inasmuch as the arcuate surfaces of the support member follow the contour of concentric circles or other continuous geometric arcuate shapes such as ellipses, portions of which have been removed below a chord substantially parallel with but of lesser length than the diameter or major or minor axis of the shape. FIG. 2A shows a possible shape of the mandrel wing shoe 36 the inner and outer surfaces of which follow a generally circular path which is interrupted by a chord 36A of lesser length than the horizontal diameter 36B. Such a horseshoe shape provides support for the said mandrel wing support member 18 and prevents same from falling vertically therefrom when said component is released from the vertical support plate 24. Such support is provided by virtue of the fact that the mandrel wing support member 18 is provided in its upper region with a cross-sectional shape which is substantially identical to the hollow provided in the shoe 36. The configuration of the mandrel wing support member 18 is such that the body of this component is supported within the shoe 36, whereas the lugs 32 depend beneath the body of the support member and furthermore beneath the lowermost edges of the shoe 36.

It will be seen from FIGS. 1 and 3 that the trolley 2 is provided with a winder 38 which is connected to suitable gearing 40 to cause a sprocket 42 to rotate which in turn causes a toothed belt or chain 44 to travel around said sprocket 42 and additionally around a remote sprocket 46 disposed proximate the opposite end of the trolley 2. A link 48 is provided between the chain 44 and the table 26 such that the motion of the said chain causes insertion or retraction of the components 18, 20 into and from the bodymaker 12 in the direction shown by arrow 50. It will be appreciated that after the components 18, 20 have been disconnected from the structural frame member 14 of the bodymaker and are retracted by the actuation of the winder 38 such that the free ends of said components 18, 20 are moved beyond the outer surface of the structural frame member 16, the trolley 2 can then be moved laterally of the body maker 12 along rails 8, 19 as shown by arrows 52, 54 in FIG. 2.

A more preferable arrangement is shown in FIG. 3 which demonstrates the facility of the translatable indexable table 26 on which the support frame 22 is mounted. Specifically, after careful and complete retraction of the mandrel wing support member 18 from the shoe 36 in which it was supported within the body maker 12, and of the mandrel 20, and the free ends are sufficiently clear of the outer surface of the structural frame member 16, the entire assembly can be rotated as shown at 55 on the indexable table 26 into a position shown generally at 56. The position of the components 18, 20 as shown at 56 not only stabilise the entire trolley assembly but also facilitates the exchange of the components 18, 20 for alternate components which can thus be inserted into the bodymaker rapidly.

It can also be seen from FIGS. 1 and 3 that the mandrel 20 is provided on its free end 21 with a formation 58 which may be received in a hydraulic clamping device 60 capable of rigidly securing said free end 21 of the mandrel 20 against the structural frame member 14 in a cantilever fashion after said mandrel has been disconnected from the vertical support plate 24 and is readied for use within the bodymaker 12. Although not specifically shown in the figures, the mandrel wing support member 18 may be also suitably secured to the structural frame member 14 after same has been disconnected from the vertical plate 24, and the trolley unit 2 has been entirely removed from its location adjacent the bodymaker, as would be the case during the operation thereof. Alternatively the mandrel wing support member 18 may be mechanically retained against the structural frame member 14.

Referring finally to FIGS. 5A, 5B, 6A, 6B, 6C the vertical support plate 24 is shown provided with a plurality of apertures 62, 64, 66 through which suitable bolts may pass to secure the mandrel wing support member to the rear of said vertical plate 24. One of said bolts is shown at 68.

In the lower half of the vertical support plate 24, there is provided a back plate 70 which is rigidly secured to the rear surface of the vertical support plate 24 and is provided with an aperture 72 of a predetermined non-circular cross-sectional shape, in FIG. 5A square, which receives a protrusion of generally identical shape but fractionally reduced dimensions provided at the alternate end of the mandrel 20 to the free end 21. The inter-engagement of the protrusion at the relevant end of the mandrel (not shown) and the aperture 72 ensures that the mandrel is angularly correctly orientated with respect to the mandrel wing support member, and accordingly with respect to the mandrel wings depending therefrom. This is essential for the correct operation of the bodymaker 12, as is the vertical axis separation of these components. Any incorrect orientation or displacement of either of these components will result in a large number of defective tin box bodies being produced by the bodymaker. Alternately, the axial displacement of these components, while being of importance, is of lesser importance to the angular orientation and vertical axial separation thereof, and tolerances can be accommodated. The provision of complimentary inter-engaging means provided on the mandrel (or on the mandrel wing support member) and on the vertical support plate 24 constitutes an independently aspect of this invention.

An alternative configuration of the inter-engaging means is shown in FIGS. 6A, 6B and 6C where an hexagonal aperture 74 provided in a back plate 76 rigidly secured to the rear surface of the vertical support plate 24 receives a correspondingly shaped and dimensioned protrusion on one end of the mandrel 20. An additional feature of the configuration shown in FIGS. 6A, 6B, 6C is the provision of spring loaded latch means 78, 80 which automatically engage within an annular channel 82 provided in a protrusion 84 having a cap 86 mounted on one end of the mandrel 20. Said automatic engagement is effected as the translatable indexable table 26 on which the vertical support plate 24 is supported is moved towards the bodymaker 12 in which the components 18, 20 are already connected. In particular, the spring loaded latch means 78, 80 are provided with inwardly angled front faces 88, 90 which contact the edges of the cap 86 as the vertical support plate is moved proximately of the structural frame member 16 of the bodymaker. Further motion of the vertical support plate 24 towards the said structural frame member causes the spring loaded latch means 78, 80 to be moved outwardly and laterally of said vertically support plate against springs 92, 94 to a sufficient extend such that the cap 86 can pass through said latch means which subsequently return under the action of the springs 92, 94 and engaged within the annular channel 82. Latch means 78 is shown in the engaged position in FIG. 6B, whereas latch means 80 is shown in a deflected position.

Said latch means 78, 80 are connected to levers 100, 102 which are pivotable about pivots 96, 98, said levers being provided with pawls 104, 106 which allwo for the manual deflection of the latch means to allow the disconnection of the vertical support plate from the mandrel. Such disconnection is effected subsequent to the connection of the mandrel within the bodymaker and to the structural support plate 14 thereof by the hydraulic clamps 60, whereafter the translatable indexable table 26 and associated vertical support plate 24 and frame 22 can be entirely withdrawn leaving the components 18, 20 rigidly secured within the bodymaker 12.

After said operations, the trolley 2 can be removed from its position adjacent the bodymaker and operation thereof can commence.

Finally, referring to FIG. 6C, the latch means 78, 80 can be seen in elevation and are provided with arcuate edges 108, 110 such that there is an area of contact between said latch means and a circular boss 112 disposed immediately behind the cap 86 and connected thereto. The combination of this connection and the inter-engagement of the hexagonal formation also provided on the end of the mandrel 20 with the aperture 74 provided in the back plate 76 rigidly secured to the vertical support plate 24 ensures a positive and secure connection of and sufficient support for the mandrel 20 as it is being withdrawn from the bodymaker 12. It is to be mentioned that a similar configuration of connection as shown in FIGS. 6A, 6B, 6C of mandrel to vertical support plate can be provided for the mandrel wing support member 18 although it is not specifically shown in the Figures.

What is claimed is:

1. A support means to which one or more components can be releasably connected, said components being adapted for use in a bodymaker and said support means being translatable to delivery said one or more components into said bodymaker, said support means comprising translation means for moving said one or more components parallel with the longitudinal axes thereof towards and away from said bodymaker and releasable connection means said one or more components having a first end provided with first connection means by which said one or more components can be connected to the body maker and a second end having second connection means by which said one or more components can be connected to the support means, said second connection means being one part of a male/female connection arrangement and said support means being provided with the other part of said arrangement, the outer surface of the male part of the arrangement contacting the inner surface of the female part in at least two places, characterised in that angular displacement of said one or more components relative to said support means is prevented by virtue of non-circular corresponding shapes of the male part and the female part of the connection arrangement.

2. A support means according to claim 1 characterised in that at least one of said one or more components is a mandrel.

3. A support means according to claim 1 characterised in that the components include a mandrel and associated mandrel forming wings.

4. A support means according to claim 1 characterised in that the male part of the connection arrangement is a non-circular plug formation, the female part being a correspondingly shaped socket, recess or aperture in which the plug is received.

5. A support means according to claim 4 characterised in that the plug formation is disposed on one end of the mandrel and the correspondingly shaped socket, recess or aperture is provided on the support means.

6. A support means according to claim 5 characterised in that the support means is provided with latch means which are automatically received in channels provided in the plug formation as said support means is moved towards the plug formation to effect connection of said one or more components to said support means.

7. A support means according to claim 6 characterised in that a pair of latch means is oppositely disposed on either side of the socket, recess or aperture in the support means.

8. A support means according to claim 7 characterised in that the latch means are surprisingly biased towards each other.

9. A support means according to claim 8 characterised in that the latch means have inclined faces which come into contact with edges of the plug formation as the support means is moved towards said one or more components, the orientation of the inclination of said faces being such that further motion of said support means towards said one or more components causes deflection of said latch means laterally outwardly of said plug formation allowing the passage of said plug formation past the latch means and into said socket, aperture or recess whereafter the latch means are received in said one or more channels behind the front face of said plug formation.

10. A support means according to claim 9 characterised in that the latch means under their spring bias snap into place after the plug formation is fully received in said socket, aperture or recess.

11. A support means according to claim 6 characterised in that said latch means have at least partially arcuate edges which contact arcuate surfaces of said one or more channels over a predetermined length of said edges.

12. A support means according to claim 1 characterised in that the support means comprises a vertical plate mounted on horizontal guide rails and provided with translating actuation means which allow a user to control and effect the horizontal translation of the support means along said guide rails.

13. A support means according to claim 12 characterised in that the support means can rotate with respect to the guide means to allow the components connected thereto to be rotated away from the bodymaker.

14. A support means according to claim 13 characterised in that the support means is disposed on a table which is rotatably indexable with respect to the guide means, said table being latched in at least two positions.

15. A support means according to claim 1 characterised in that the support means is mounted on trolley means which can be rolled into position laterally of the bodymaker on rails, and which can be locked in said position immediately prior to translation of the support means and said one or more components connected thereto in a direction parallel to the axes of said one or more components.

16. A method of exchanging one or more working components releasably mounted within a bodymaker comprising the steps of disconnecting said components from actuating means within the bodymaker which effect working motion of said components, bringing support means translatable axially of said components on guide means adjacent said components at one end thereof and into locking engagement therewith to provide support for said components, releasing said components from their mounting with the bodymaker, and translating said support means with components engaged thereto away from said bodymaker until the components are without the structure of said bodymaker, wherein angular displacement of the components with respect to the support means when connected thereto is prevented by a connection arrangement therebetween, said connection arrangement comprising a male part and a female part which are of corresponding non-circular shape.

17. A method according to claim 16 characterised in that the direction of translation away from the bodymaker is parallel with the longitudinal axes of the components when mounted within said bodymaker.

18. A method according to claim 17 characterised in that the longitudinal axes of said components is horizontal.

19. A method according to claim 18 characterised in that the connection arrangement comprises firstly a non-circular plug formation on one of the support means and said one or more components, the other having a correspondingly shaped socket, recess or aperture in which the plug formation is received.

20. A method according to claim 19 characterised in that the plug formation has a front face and is of a predetermined depth and is provided with one or more recessed channels behind said front face in the depth of said formation and the support means is provided with latch means which are automatically received in said channel as said support means is moved towards the plug formation to effect connection of said one or more component to said support means.

21. A method according to claim 20 characterised in that the channel extends substantially continuously behind the front face of the plug formation and a pair of latch means is oppositely disposed on either side of the socket, recess or aperture in the support means.

22. A method according to claim 21 characterised in that the latch means are springingly biased towards each other.

23. A method according to claim 22 characterised in that the latch means have inclined faces which come into contact with edges of the plug formation as the support means is moved towards said one or more components, the orientation of the inclination of said faces being such that further motion of said support means towards said one or more components causes deflection of said latch means laterally outwardly of said plug formation allowing the passage of said plug formation past the latch means and into the socket, aperture or recess whereafter the latch means are received in the one or more channels behind the front face of said plug formation.

24. A method according to claim 23 characterised in that the latch means under their spring bias snap into place in said one or more channels.

25. A method according to claim 16 characterised in that the translation of the support means is effected by rotation of winding means whose rotary motion is converted to linear motion of a component connected to said support means.

26. A method according to claim 16 characterised in that the support means can rotate with respect to the guide means to allow the components connected thereto to be rotated away from the bodymaker.

27. A method according to claim 26 characterised in that the support means is disposed on a table which is rotatably indexable with respect to the guide means, said table being latched in at least two positions.

28. A method according to claim 16 characterised in that the correction of the at least one of the components to the support means is effected simultaneously as the support means is translated towards said one end of said component.

29. A method according to claim 28 characterised in that the connection between said support means and said one end of said one or more components is completed exactly at the end of the extent of travel of said support means.

30. A method according to claim 16 characterised in that the support means is mounted on trolley means which can be rolled into position laterally bodymaker on rails, and which can be locked in said position immediately prior to translation of the support means and said one or more components connected thereto in a direction parallel to the axes of said one or more components.

* * * * *